May 30, 1961  R. D. LACOE, JR  2,986,070
MAGAZINE SLIDE PROJECTOR WITH SNAP ACTION FEEDING, SLIDE
REVIEW AND RESTACKING MEANS
Filed May 8, 1957  3 Sheets-Sheet 1

INVENTOR.
RALPH D. LACOE JR.
BY
Knox & Knox

INVENTOR.
RALPH D. LACOE JR.
BY
Knox & Knox

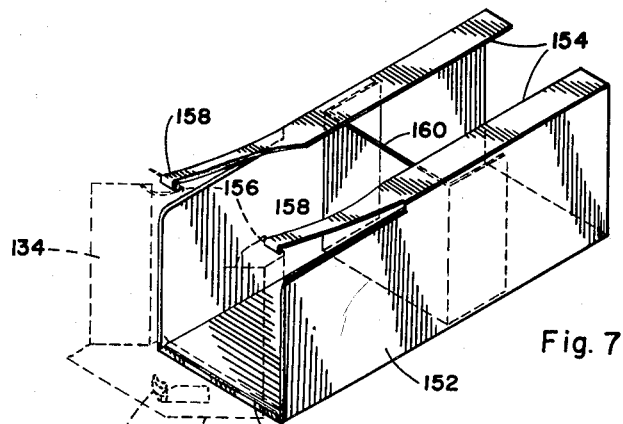
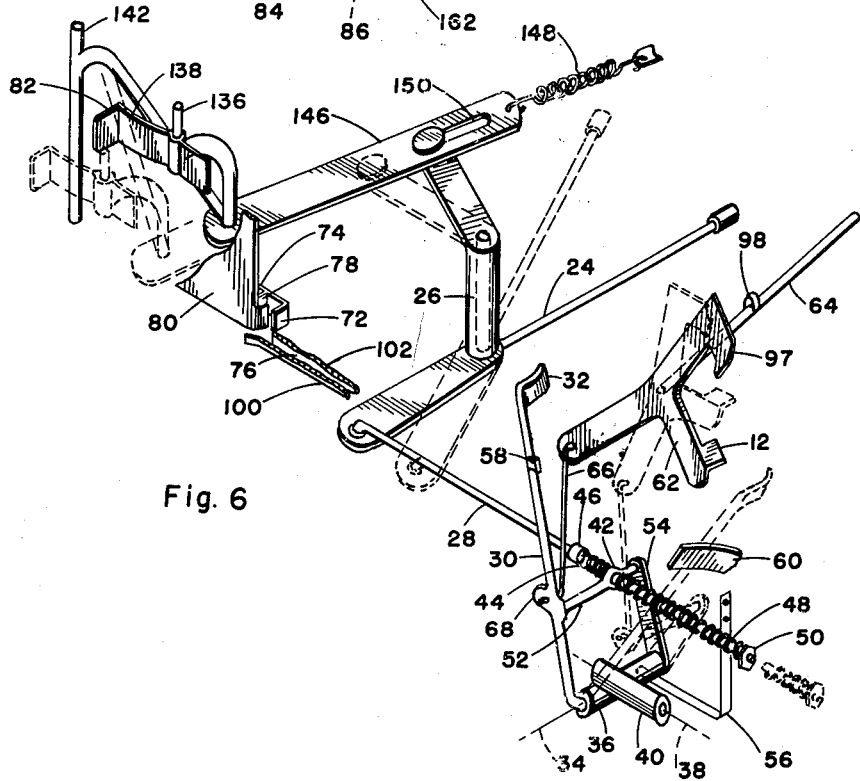

United States Patent Office 2,986,070
Patented May 30, 1961

2,986,070

MAGAZINE SLIDE PROJECTOR WITH SNAP ACTION FEEDING, SLIDE REVIEW AND RESTACKING MEANS

Ralph D. Lacoe, Jr., Box 1510, San Diego, Calif.

Filed May 8, 1957, Ser. No. 657,982

21 Claims. (Cl. 88—28)

This invention relates generally to projectors for picture slides and more particularly to the actual slide manipulation means in such projectors. The primary object of the invention is to provide a projector wherein the ejection of the viewed slide and the insertion of the next slide into the projection gate is carried out with a snap action, so that a new image is projected on the viewing screen so rapidly that there is no apparent blank between the slides and the flash of light on the screen occurring between slides in other projectors is eliminated.

Another object of this invention, equally important to the preceding object, is to provide a projector wherein the slides are available for manual extraction and replacement of slides in the projection gate as well as in the magazine and in the receiving tray.

Another object of this invention, ancillary to the immediately preceding object, is to provide a projector with projection gate front and rear aperture plates of special construction and with one of the plates being capable of being raised and tilted away from the other plate to make a slide in the projection gate easily available.

Another object of this invention, also relating to special structure of the projection gate, is to provide for the automatic re-centering or proper re-positioning of the slide replaced therein.

Another object of the invention is to provide specially constructed means for receiving and restacking the viewed slides, this means being structurally and functionally related to the above mentioned specially constructed projection gate, a chute provided at the entrance of the restacking means and the receiving drawer being open at the top to permit finger access to slides therein.

Another object of the invention is to provide special means for holding a slide ejected from the projection gate upright so that it functions as a stop for a slide newly inserted into the projection gate, this structure being mechanically related to the other elements of the restacking means as well as to other elements concerned with the above mentioned means for achieving the snap action slide change.

Yet another object of this invention is to provide a completely satisfactory means for replacing in the projection gate a slide which has been ejected therefrom. It is interesting to note, at this point, that the instant projector makes it possible to reinsert any slide for review with a minimum of difficulty.

The last object to be mentioned specifically is to provide a projector which is ideally adapted for being driven by simple motor means.

With these objects definitely in view, together with other objects and advantages which will appear hereinafter as this description proceeds, this invention resides in the novel construction, combination and arrangement of elements as hereinafter described in the specification, particularly pointed out in the claims, and illustrated in the accompanying drawings, in which:

Figure 1 is a plan view of the assembled projector, portions being broken away to disclose underlying portions;

Figure 2 is a vertical sectional view taken on the line 2—2 in Figure 1, or this view may be considered an elevational, front view with the front plate of the base removed, since practically all of the portions are shown in elevation. Certain portions have been broken away to shown underlying structures, particularly the element referred to hereinafter as the second stop means and the view also including a diagrammatic representation of the edge portion of a slide in the position assumed by such slide when it is in abutting relation with a slide in the projection gate, the slide engager being fragmentarily represented in dash line in the position wherein it is held while the driving spring is loaded in order to achieve the snap action referred to above;

Figure 6 is a highly diagrammatic view of the structure directly related to the snap action feature of the invention, and this view also aids materially in indicating the interrelation of this structure with the other parts of the invention;

Figure 7 is an isometric view of the receiving drawer, the view also including a dash line representation of the chute of the restacking assembly and a fragmentary showing of the counter-pusher.

Similar characters of reference indicate similar or identical elements and portions throughout the different views in the drawings.

Figure 1:
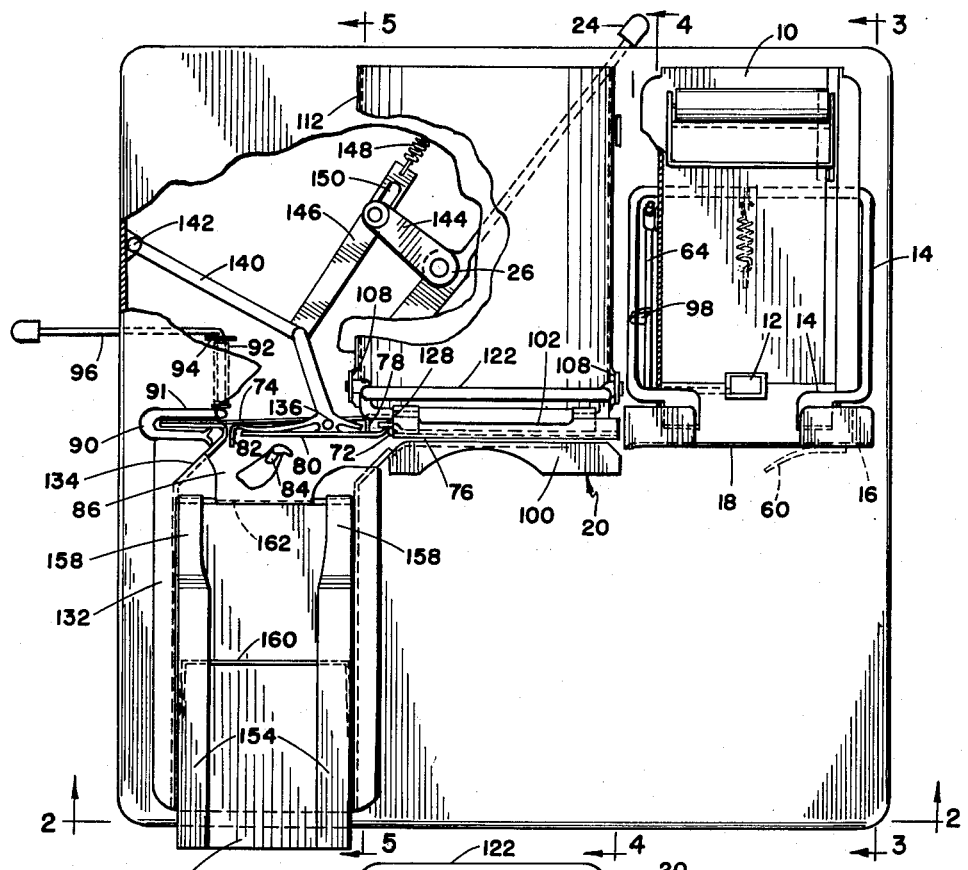
Figure 2:
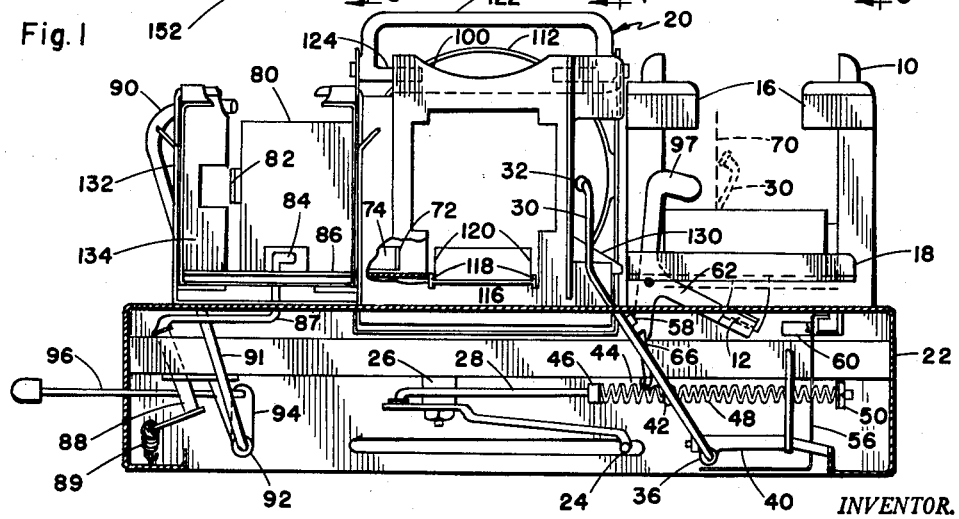
Figure 3:
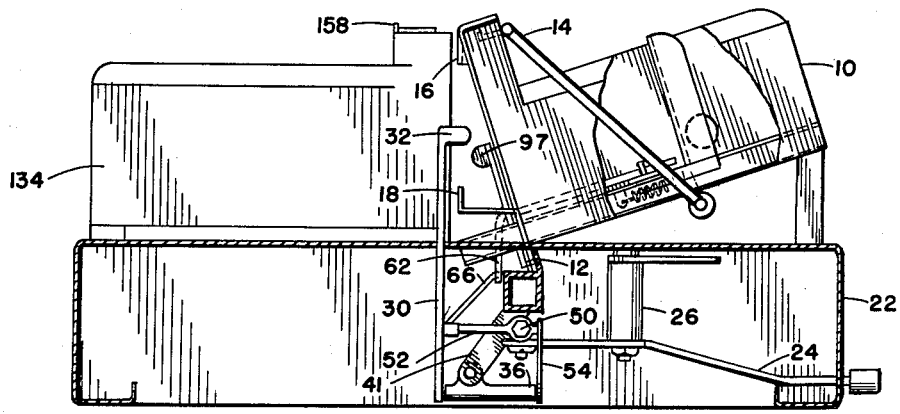
Figure 3 is a vertical sectional view taken substantially on line 3—3 in Figure 1.

Referring now to the drawings in detail, the embodiment of this invention represented therein includes a magazine 10 with a feeder element 12, shown best in Figures 1, 2 and 6, which lifts the foremost slide in the magazine 10 into engagement with a biased element 14, in the initial step of feeding individual slides. This magazine assembly is fully described and illustrated in my Patent No. 2,814,965, issued December 6, 1957, and it is believed that a detailed description thereof in this application is unnecessary. The biased element 14, best illustrated in Figures 1 and 3, tilts the said foremost slide, after being raised by the feeder element 12, into a substantially vertical position with the top of the slide engaging the vertical stop plates 16 and the lower edge portion of the slide being disposed then in a slideway 18 which is best illustrated in Figures 1, 2 and 3.

A projection gate generally indicated by the numeral 20, is disposed in the same general plane as the slideway 18 and the slides will be individually fed from the slideway into the projection gate and the term "trackway" will be used herein to signify in a general way the path defined by the said slideway 18 and the projection gate 20. The magazine and projection gate, as well as various other elements of the projector are supported on the sheet metal base frame 22, the exact construction of it and the exact manner of fixing the parts on this frame being thought to be relatively unimportant in this disclosure. The drawings do, however, indicate the general arrangement of parts in a perfectly operating projector representing an acutal reduction to practice of this invention. It may, however, be pertinent to note that said base frame is hollow and substantially square in planform and that the magazine 10 is offset laterally from the projection gate and mounted on the top of said base frame 22. Power means 24, represented as a hand lever for simplicity, is operatively mounted within the base frame, this lever being pivoted as indicated at 26 and having a pivotal connection with the rod element 28 whereby this rod element is reciprocated or driven with a to-and-fro motion and positively driven in both directions, as will be clearly evident from an inspection of Figure 6. A slide engager 30 is provided with a flattened extremity 32 and is mounted for pivotal action on an axis 34, by means of a barrel bearing 36, and for limited pivotal action about an axis 38, by means of a barrel bearing 40. A bracket element 41, best shown in Figure 3, may be used to support this two-barrel or universal mounting, the function thereof being obviously to allow the slide engager to move in two planes.

The rod element 28 is supported at an intermediate point thereof in a slide bearing 42 and a helical spring 44 is compressed between this slide bearing 42 and a collar 46 in fixed relation on the rod element 28. Another helical spring 48 is also co-axially mounted on the rod element 28 and compressed between the slide bearing 42 and a nut 50 threaded onto an end portion of the rod element 28. A hanger bar 52 is rigidly secured to an intermediate portion of the slide engager 30 and extends normally thereunder, the other end of the hanger bar 52 being secured to a support arm 54, as best illustrated in Figure 6. A spring 56 is secured in any suitable manner to the base frame, as indicated in Figure 2 and a portion of this spring 56 engages one end portion of the barrel 36 to bias the slide engager toward a position in front of the general plane of the slideway 18. As a result, the slide engager is tilted forwardly away from the slide in the slideway 18, when the slide engager is making its return motion. At the end of said latter motion or travel, the slide engager is again returned to said plane by the action of a projection 58 on the slide engager and an inclined plane element or cam 60 fixed to the base frame 22, as best illustrated in Figures 1, 2 and 6.

A compound bell crank 62 is rigidly secured to a forward end of a rocker shaft 64, the same bell crank also carrying the beforementioned said element 12, and the bell crank is moved by an inflexible link 66 operatively connecting the bell crank with an intermediate portion of the slide engager 30 as indicated at 68 in Figure 6.

Snap action feeding

Figure 5:
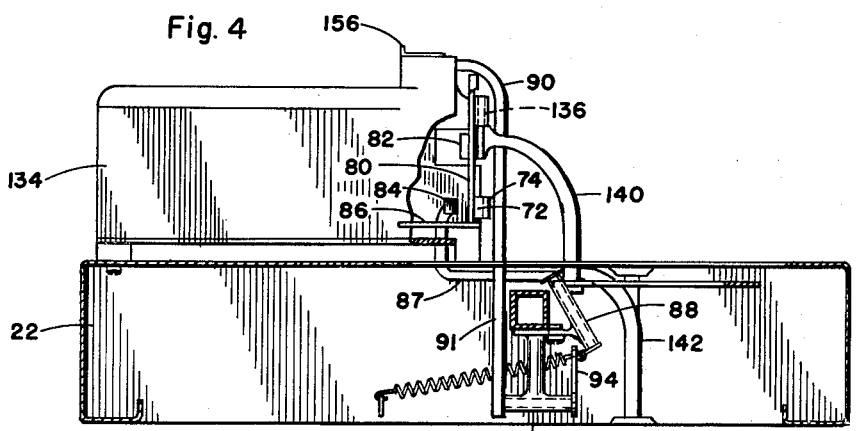
Figure 5 is a vertical sectional view taken substantially on the line 5—5 in Figure 1.

Since the slide engager is thus impositively and resiliently driven, it will be clear how a snap action or accelerated feed is accomplished. If reference be made to Figure 2, the edge 70 of a slide in the position shown, holds the slide engager in the dash line shown in that figure while the spring 48 is compressed or loaded by the continued movement of the rod element 28. The slide having its edge 70 located as shown is arrested in that position by a slide in the projection gate 20, and the last mentioned slide is held in the projection gate by a spring stop 72 secured to the free end of the spring 74. This spring stop 72 is best illustrated in Figure 2, as to the position thereof relative to the projection gate, and this same spring stop is illustrated also in Figure 1 and in Figure 6, and an end view of the spring stop is provided in Figure 5. The critical relationship is simply that the spring stop 72 must arrest a slide at the proper position for viewing in the projection gate, and when so arrested, this slide functions as a stop for the succeeding slide, the edge of which is indicated at 70. Since the movement of the lever 24 continues, it being assumed that this projector will ordinarily be operated by an electric motor, the spring 48 is compressed and a snap action will obviously be obtained at the instant that the spring stop 72 is released. This is accomplished by the pusher 80, a part of the restacking assembly hereinafter described more fully, the movement of the pusher 80 into its extreme rearward position resulting in the engagement of this pusher 80 with a protrusion 78 provided on the spring 74, causing the spring stop 72 to be moved from the position shown in Figure 6 to the position shown in Figure 1, thus removing the obstruction in the channel 76, referred to hereinabove generally as the trackway for the slides. Obviously the result is an immediate, accelerated movement of the slide in the projection gate as well as the slide whose edge is indicated at 70 with the result that the first mentioned slide is ejected from the gate and the last mentioned slide is brought into viewing position, a second stop 82 being provided at the opposite edge of the pusher 80 to arrest the ejected slide, which then functions as a stop for the slide just snapped into the projection gate. It will be understood that the spring 44 allows for a certain amount of over-travel of the rod element 28 after the slide engager 30 has reached the limit of its travel toward the right in Figures 2 and 6. This feature makes a precise adjustment of the timing of the actuation of the pusher 80 and the slide engager unnecessary, although it will be understood also that the pusher 80 must be timed to withdraw the spring stop 72 subsequential to the time of the arrival of the slide engager 30, in its movement toward the projection gate, at the dash line position indicated in Figure 2.

Individual slide review

Since the slide ejected from the projection gate must initially be held vertical to function as a stop for the next slide, there is provided a counter-pusher 84 which projects upwardly through the floor 86 and in slightly spaced relation to the front face of the pusher 80 when the latter is in the fully withdrawn position indicated in Figure 1, so that a slide can be ejected from the projection gate and supported between the pusher 80 and the counter-pusher 84 and with one edge engaging the second stop 82. The counter-pusher is carried on a long, bent shank 87 having an intermediate portion journaled in an inclined bearing 88 and spring biased by a spring 89, illustrated only in Figure 2, toward the position indicated in Figures 1 and 5. When the pusher 80 moves forwardly, the counter-pusher, by reason of the inclination of the bearing 88, is gradually depressed beneath the floor 86 into inoperative position. The review arm 90 is provided with an upper terminal which engages a slide held between the pusher 80 and the counter-pusher 84, and this review arm may be used to press this slide into the projection gate against the pressure of the spring 48 on the slide engager 30. This is accomplished by any suitable means such as the manually operated push rod 96 which is connected with a bell crank 94 on the end of a long shank 91 of the review arm which is journaled as indicated at 92 in Figure 2. In other words, pressing the push rod 96 as to the right in Figure 2 pushes a slide adjacent to the pusher 80 into the projection gate for review, and the structure provided for the snap action effect also permits the reverse ejection of a slide in the projection gate back to the position indicated by the line 70 in Figure 2. At the same time, a finger or retractor 97, integral with the bell crank 62 is moved, by virtue of its inner connection with the slide engager and rod element 28, to a position shown in full lines in Figure 6 to retract the foremost slide in the magazine rearwardly so that the slide being ejected, in reverse, from the projection gate will not be obstructed. At the same time, a cam 93 on the rocker shaft 64, as shown in Figures 1 and 6, engages the under-side of an intermediate portion of the biased element 14 so that this element is also retracted slightly for further decreasing obstruction of a slide being ejected, in reverse, from the projection gate when the review arm 90 is actuated, as well as in normal slide feeding.

Manual extraction of slides

Figure 4:
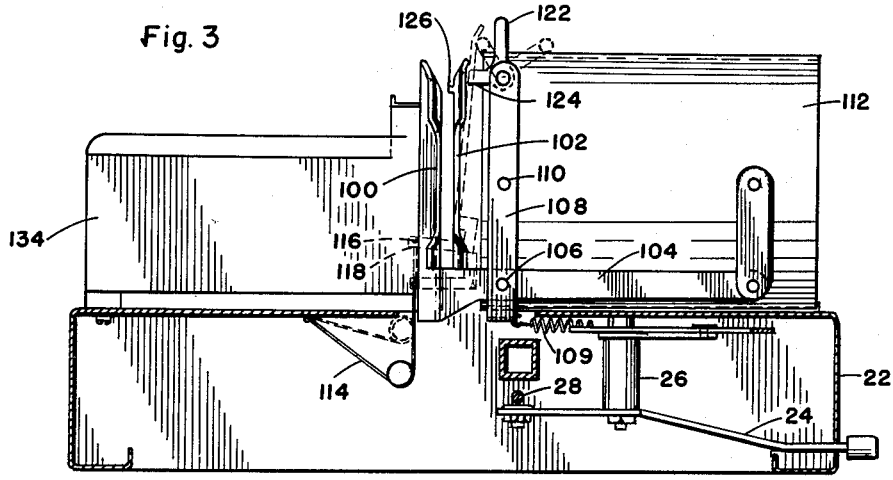
Figure 4 is a vertical sectional view taken on line 4—4 in Figure 1.

The project gate comprises a front aperture plate 100 and a rear aperture plate 102, shown in Figures 1, 2 and 4, and these plates are mounted for equal and opposite movement, the hereinafter explained tilting of the rear aperture plate being momentarily disregarded, to enable the same to adjust for slides of different thicknesses. A single reach bar 104 is integral with and carries the front aperture plate 100 as shown clearly in Figure 4, and is pivoted as at 106 to one of a pair of hanger bars 108, best illustrated in Figures 1 and 4, these levers or hanger bars being effectively centrally pivoted as shown at 110 in Figure 4 on any adjacent structure such as the lamp house 112. The lower ends of the hanger bars 108 are connected and are biased rearwardly by a spring 109, illustrated only in Figure 4. The rear aperture plate 102 is biased downwardly and forwardly by a spring 114 secured to a cross bar 116 carried on and between the forward ends of forwardly extending fingers 118 which may be formed integral with the rear aperture plate 102. A pair of slots 120 are provided in the front aperture plate, as best shown in Figures 2 and 3, to accommodate the fingers 118 in their depressed, inoperative position. A handle 122 of yoke form is formed integral with levers 124 which extend forwardly and toward each other and are pivoted to the upper edge of the rear aperture plate 102. It will be clear that actuation of the handle 122 will raise the rear aperture plate, along with any slide in the projection gate, by reason of the coincidental raising of the fingers 118, and it will also be clear that the rear aperture plate can tilt backwardly or away from the front aperture plate, as shown in dash line in Figure 4, to give easy access to any slide in the projection gate. The upper edges of the fingers 118 are spaced slightly below the lower edges of the rear aperture plate proper and, since the spring 114 urges the rear aperture plate forwardly at the bottom, a slide thus evaluated by raising the rear aperture plate also tends to be tilted forwardly to make the slide even more easily grasped by the fingers. The rear aperture plate is provided with a lip 126, best shown in Figure 4, to carry a slide downwardly when being employed in the projection gate.

It should be carefully noted that there is definite cooperation between the projection gate structure detailed above and the means for review and the special restacking structure. For example, a lug 128 is provided on the rear aperture plate for engagement with the pusher 80, whereby the front face of the pusher 80 is maintained approximately in coplanar relationship with the rear aperture plate so that the difference in slide thicknesses will not interfere with the proper function of the machine. A cam 130 is provided on the edge of the rear aperture plate adjacent to the slide engager 30, and when the rear aperture plate is raised, this cam 130 retracts the slide engager 30 as to the right in Figure 2 to relieve friction between the slide engager and any slide in the projection gate, and it should be carefully noted that, upon re-lowering of the rear aperture plate, the slide engager is permitted to advance toward the projection gate under the action of the spring 48 to re-locate a replaced slide accurately in the projection gate. The feature mentioned immediately above is actually quite valuable to the operator of the machine since it allows him to replace the slides with a minimum of care because the accurate relocation is accomplished by the machine itself.

Another important advantage now becomes evident. It will be recalled that this projector has been developed with a view to operation thereof by an electric motor and this makes it all the more important that the projection gate, once opened to remove and/or replace a slide, should be automatically returned when the machine is again started, so that the possibility of jamming the machine is avoided. The spring 114 constantly urges the rear aperture plate into normal, operative position and when the operating lever 24 is moved, either manually or by a motor, at the time when the machine is restarted, the rear aperture plate is released to return to normal operative position.

Restacking assembly

Considerable reference has been made hereinabove to certain of the elements of this assembly, this being due to the fact that these elements co-operate with the elements of the other assemblies. A restacker casing 132 is fixed to the base frame 22 in lateral offset relation and parallel to the projection gate 20. The casing 132 constitutes a flared top trough with a chute 134 extending obliquely from the projection gate to the adjacent end of the casing. The pusher 80 has already been described and this pusher is pivotally mounted on a pin 136 and a cross bar 138 which limits the pivotal movement of the pusher, and the pin and cross bar may be formed integral with the upper end of an arm 140, which is itself pivoted to the base frame 22, shown best in Figures 1 and 5, this last feature being indicated at 142. An arm 144 is fixed to the lever 24 and is connected to the link 146, the latter being biased in one direction by a spring 148, for lost motion actuation as indicated by the slot 150 in the link 146. The action of the counter-pusher 84 has already been described. It is, however, important to note that the movement of the pusher 80, second stop 82 and the slide carried thereby will have a lateral component as well as a forward component so that the slide is moved without friction along the obliquely disposed chute 134. The obliquity of the chute 134, aside from the function of offsetting the slide restacking assembly, has the further important function of preventing the slides, once pushed forwardly along the chute, from tilting back when the pusher 80 is withdrawn. The slides, having been pushed along the chute, are retained substantially upright by the wall of the chute 134 represented at the left of Figure 1. A receiving drawer or tray 152 may be employed, but it should be understood that the restacker casing 132 can itself function as a receiving drawer or tray, in which case a slide bumper, as shown, will be operatively mounted therein to hold the slides upright as they are fed into the casing 132. Such a bumper is described immediately below for use with the receiving tray 152. A removable receiving drawer 152 is provided, this drawer being generally U-shaped with inwardly projecting opposing flange plates 154 defining a finger access slot therebetween. Fixed hook elements 156 are provided on the upper, forward edges of the chute 134 and the end portions of the flange plates are separated from the adjacent wall portion of the receiving drawer to constitute spring hook elements 158 which engage the fixed hook elements 156 while the adjacent lower or bight portion of the drawer engages the undersurface of a projecting portion of the floor 86, or as possibly best shown in Figure 7. To place the drawer in position, the spring hooks 158 are engaged with the fixed hooks 156 and the drawer is sprung downwardly until the said bight portion snaps under the forward edge of the floor 86, the drawer then being reasonably firmly secured within the casing 132. A bumper 160 is frictionally slidably mounted in the drawer and is pushed back gradually by the slides as they are fed into the drawer, and the spring hook elements 158, together with a shallow lip 162 on the adjacent bight portion of the drawer, function as means to hold slides in the drawer when the same is removed.

Minor variations from the disclosed embodiment may be resorted to without departure from the spirit and scope of this invention and the foregoing specification and the drawings should be considered as merely illustrative rather than limiting.

Having described my invention, what I claim as new and desire to secure by Letters Patent is:

1. In a projector: a base frame; a slide magazine mounted on said frame and having a slideway extending transversely thereof at the mouth of the magazine; a projection gate mounted on said frame and disposed in substantially the same general plane as said slideway and therewith constituting a continuous trackway for slides; a slide engager mounted on said frame for movement in said plane, in one portion of its travel along said slideway and toward said projection gate; power means comprising a reciprocating element positively driven in both directions, a driving spring operatively and resiliently connecting said slide engager with said element; stop means operated by said power means for arresting said slide engager in said movement thereof at a point short of said projection gate, without arresting said element, so that said driving spring is loaded; and means also operated by said power means for releasing the slide engager for a snap action movement in the remaining portion of its travel toward said projection gate.

2. Apparatus according to claim 1 wherein said stop means for arresting comprises a stop extending, in the operative position thereof, across said trackway for temporarily arresting the movement of successive slides along said trackway; and said means for releasing comprises means to retract said stop to an inoperative position after said stop has arrested a slide.

3. Apparatus according to claim 2 wherein said stop is positioned at the side of said projection gate remote from said magazine, so that when slides are in abutting, series relation in said trackway, said snap action movement will be transmitted to any slide in said projection gate as well as to the slide directly engaged on said slide engager.

4. Apparatus according to claim 2 and including a restacking assembly comprising a chute and a slide pusher operatively mounted to push slides ejected from said projection gate into said chute; said pusher constituting said means to retract said stop.

5. In a projector: a slide magazine having a slideway extending transversely thereof at the mouth of the magazine; a projection gate disposed in substantially the same general plane as said slideway and therewith constituting a continuous trackway for slides; a slide engager mounted for movement in said plane, in one portion of its travel along said slideway and toward said projection gate; power means comprising a reciprocating element positively driven in both directions, a driving spring operatively connecting said slide engager with said element; stop means for arresting said slide engager in said movement thereof at a point short of said projection gate, without arresting said element, so that said driving spring is loaded; and means for shifting said stop means into inoperative position thus releasing the slide engager for a snap action movement in the remaining portion of its travel toward said projection gate; and second stop means moved by said power means into said plane at the side of said projection gate remote from said magazine and spaced one slide length from the first mentioned stop means; said second stop means being functional in re-arresting slides released by the first mentioned stop means.

6. Apparatus according to claim 5 and including a restacking assembly comprising a chute and a slide pusher operatively mounted to push slides ejected from said gate into said chute; the first mentioned stop means being engaged by said slide pusher and moved thereby into inoperative position and said slide pusher simultaneously moving the second mentioned stop means into said plane.

7. Apparatus according to claim 6 and wherein said chute has a floor, and a counter-pusher operatively mounted to traverse said chute; said slide pusher, and counter-pusher in its operative position, being above said floor and on opposite sides of said plane and adapted to contact opposed faces of a slide entering said chute from said projection gate to hold this slide substantially in said plane until this slide is arrested by the second stop means.

8. In a projector: a projection gate; slide feeding means to feed slides into said projection gate; and a slide restacking assembly having a mouth in the same general plane as said gate, a slide-receiving tray offset from said mouth, a chute extending obliquely from said mouth to said tray, a slide pusher and a slide counter-pusher operatively mounted to traverse said chute, said pusher, and counter-pusher in its operative position, being above said floor and on opposite sides of said plane and adapted to contact opposed faces of a slide entering and traversing said chute and to hold the same in said plane as the slide enters said chute and also to hold the slide in a plane parallel to said plane as the slide traverses said chute, said counter-pusher being spring biased toward said pusher and being retracted, by pressure transmitted thereto by the pusher through a slide interposed therebetween, and moved out of said chute when the counter-pusher approaches said receiving tray.

9. In a projector: a slide magazine having a mouth; a projection gate disposed in substantially the same plane as said mouth; a slide engager mounted for movement in one direction in said plane across said mouth and toward said gate to push a slide from said mouth into said gate, and means to tilt said slide engager, when not engaged with a slide, during a major portion of its return movement, whereby the slide engager in said return movement travels in a path spaced from said plane so that the slide engager avoids contact with a slide in said mouth.

10. In a projector: a base frame; a slide magazine mounted on said frame and having a slideway extending transversely thereof at the mouth of the magazine; a projection gate mounted on said frame and disposed in substantially the same general plane as said slideway and therewith constituting a continuous trackway for slides; a slide engager mounted on said frame for movement in said plane, in one portion of its travels along said slideway and toward said projection gate; power means comprising a reciprocating element positively driven in both directions, a driving spring operatively and resiliently connecting said slide engager with said element; stop means operated by said power means for arresting said slide engager in said movement thereof at a point short of said projection gate, without arresting said element, so that said driving spring is loaded; and means also operated by said power means for releasing the slide engager for a snap action movement in the remaining portion of its travel toward said projection gate; and a retractor member linked with said slide engager to enter said magazine adjacent to said plane, during the latter part of the movement of said slide engager toward said projection gate, to press the next succeeding slide away from said plane and out of frictional contact with a slide being moved in said slideway, whereby the friction on the last mentioned slide to be overcome by said spring is lessened and said snap action movement is promoted.

11. In a projector: a magazine for slides having a slideway at one end thereof; a projection gate in the same general plane as said slideway; a restacking assembly having its mouth in said plane; said slideway, projection gate and mouth constituting a continuous trackway; means for feeding slides along said trackway in one direction including a slide engager, drive means and a resilient connection between said slide engager and drive means; and a review member movable along said trackway, from the side of said mouth remote from said projection gate, in the direction opposite to said direction, and engaging a slide in said mouth to force the last mentioned slide from said mouth back into said projection gate; a corresponding retraction of said slide engager away from said projection gate being provided for by said resilient connection.

12. In a projector: a base frame; a slide magazine mounted on said frame and having a slideway extending transversely thereof at the mouth of the magazine; a projection gate mounted on said frame and disposed in substantially the same general plane as said slideway and therewith constituting a continuous trackway for slides; a slide engager mounted on said frame for movement in said plane, in one portion of its travel along said slideway and toward said projection gate; power means comprising a reciprocating element positively driven in both directions, a driving spring operatively and resiliently connecting said slide engager with said element; stop means operated by said power means for arresting said slide engager in said movement thereof at a point short of said projection gate, without arresting said element, so that said driving spring is loaded; and means also operated by said power means for releasing the slide engager for a snap action movement in the remaining portion of its travel toward said projection gate; structure defining an extension of said trackway at the side of said projection gate remote from said slideway; and a review member manually shiftable along said extension of the trackway to push a slide from said extension back into said projection gate, said spring enabling said slide engager to retract a corresponding distance and said spring being thereby loaded so that, upon release of said review member, the spring returns the slides to their respective positions occupied before operation of said review member.

13. In a projector: a projection gate having a front aperture plate and a rear aperture plate parallel thereto for supporting a slide therebetween; and means to raise one of said plates relative to the other; said one plate having a member to engage a slide in said projection gate, whereby the slide is raised with said one plate and made easily available for manual withdrawal.

14. Apparatus according to claim 13 and including a slide restacking assembly including a chute and a pusher operatively mounted to push slides ejected from said projection gate along said chute; said pusher in one position thereof having substantially coplanar relationship with one of said aperture plates and constituting a guide for slides being ejected from said projection gate, and said one of said aperture plates having a lug engaging said pusher in said one position thereof to maintain said substantially coplanar relationship.

15. Apparatus according to claim 13 and including means to bias said one aperture plate into normal operative position; a slide feeding assembly having a slide engager biased toward and engaging said one aperture plate and maintaining said one aperture plate in raised position only until manually depressed or released by movement of the slide engager on resumption of the normal movement thereof, whereby jamming of the apparatus due to resumption of operation of the projector with said one aperture plate raised is prohibited.

16. Apparatus according to claim 15 wherein said one plate has a cam engaged by said slide engager when said one plate is raised, said cam being adapted to deflect said slide engager away from said projection gate and out of frictional contact with any slide therein while said plate is in raised position and said slide engager being gradually released by said cam as said plate is lowered, and said slide engager constituting means to re-locate a slide replaced in the projection gate as said one plate is lowered into operative position.

17. In a projector: a magazine for slides having a slideway at one end thereof; a projection gate in the same general plane as said slideway; a restacking assembly having its mouth in said plane; said slideway, projection gate and mouth constituting a continuous trackway; means for feeding slides along said trackway in one direction including a slide engager, drive means and a resilient connection between said slide engager and drive means; a review member operatively mounted at said mouth to push a slide from said mouth back into said projection gate; and a finger operatively mounted and linked with said means for feeding slides, operative after each slide is fed into said slideway, to retract the next succeeding slide toward said magazine and away from said plane and out of contact with any slide being pushed in the second direction when said review member is operated.

18. In a projector: a projection gate; a slide restacking assembly to receive slides, one at a time, from said projection gate; said assembly including a chute laterally defined by confronting walls extending obliquely and laterally from said projection gate and having a mouth substantially in the same plane as said projection gate; a pusher operatively mounted to push the slides consecutively along said chute with the slides maintained constantly substantially parallel to said plane; whereby, when the pusher is retracted from a slide after pushing the same along said chute, this slide is prevented by one of said walls from falling back into the chute.

19. In a projector: a magazine for slides; a projection gate; slide feeding means to feed slides into said projection gate; and a slide restacking assembly including an open topped chute having a mouth disposed to receive slides ejected from said projection gate, a receiving drawer, a slide pusher operatively mounted to push slides from said mouth into said receiving drawer, said chute having a hook element at one edge thereof, and said drawer being generally U-shaped in cross section with an open side and a bight portion and having a spring hook element at one end of the drawer and adjacent to the open side thereof to engage the first mentioned hook element and to bias said bight portion of the drawer into engagement with said fixed opposing element of the chute, whereby the receiving drawer is removably attached to said chute, a bumper slidably mounted in said drawer against which slides may be stacked, and said spring hook element constituting means to retain slides in said drawer in stacked relation between said bumper and said spring hook element when the drawer is removed from the chute, and said hook element on the chute constituting means to hold said spring hook element retracted to permit slides to enter said drawer.

20. Apparatus according to claim 19 wherein said drawer has inwardly projecting coplanar flange plate portions at the open side, said flange plate portions defining a finger access slot therebetween, and at least one of said flange plate portions having a terminal portion constituting said spring hook element.

21. In a projector: a projection gate having a front aperture plate and a rear aperture plate parallel thereto for supporting a slide therebetween; centrally pivoted lever means to mount said plates for equal and opposite motion toward and away from each other for slide pressure sensitive adjustment to slides of different thicknesses; a slide restacking assembly including a chute and a pusher operatively mounted to push slides ejected from said projection gate along said chute; said pusher in one position thereof having substantially coplanar relationship with one of said aperture plates and constituting a guide for slides being ejected from said projection gate, and said one of said aperture plates having a lug engaging said pusher in said one position thereof to maintain said substantially coplanar relationship.

References Cited in the file of this patent

UNITED STATES PATENTS

| | | |
|---|---|---|
| 1,196,924 | Bothwell | Sept. 5, 1916 |
| 1,288,730 | Stanfield | Dec. 24, 1918 |
| 1,839,545 | Frye | Jan. 5, 1932 |
| 2,260,660 | Darwin | Oct. 28, 1941 |
| 2,503,239 | Antos | Apr. 11, 1950 |
| 2,594,162 | Hartley | Apr. 22, 1952 |
| 2,604,008 | Beekley | July 22, 1952 |
| 2,653,512 | Brock | Sept. 29, 1953 |
| 2,748,653 | Pollan et al. | June 5, 1956 |